(12) United States Patent
Taherzadeh Boroujeni et al.

(10) Patent No.: US 12,250,708 B2
(45) Date of Patent: Mar. 11, 2025

(54) ACTIVATION INSTANCE FOR DYNAMIC INDICATION OF PUCCH REPETITION FACTOR

(71) Applicant: QUALCOMM Incorporated, San Diego, CA (US)

(72) Inventors: Mahmoud Taherzadeh Boroujeni, San Diego, CA (US); Hung Dinh Ly, San Diego, CA (US); Gokul Sridharan, Sunnyvale, CA (US); Krishna Chaitanya Mukkera, San Diego, CA (US); Hari Sankar, San Diego, CA (US); Sanghoon Kim, San Jose, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 17/662,489

(22) Filed: May 9, 2022

(65) Prior Publication Data

US 2022/0361181 A1   Nov. 10, 2022

Related U.S. Application Data

(60) Provisional application No. 63/186,481, filed on May 10, 2021.

(51) Int. Cl.
*H04W 72/542* (2023.01)
*H04L 1/08* (2006.01)
*H04L 5/00* (2006.01)
*H04W 72/0446* (2023.01)
*H04W 72/23* (2023.01)

(52) U.S. Cl.
CPC ............ *H04W 72/542* (2023.01); *H04L 1/08* (2013.01); *H04L 5/0053* (2013.01); *H04W 72/0446* (2013.01); *H04W 72/23* (2023.01)

(58) Field of Classification Search
CPC .... H04L 1/08; H04L 5/0053; H04W 72/0446; H04W 72/23; H04W 72/542
See application file for complete search history.

(56) References Cited

U.S. PATENT DOCUMENTS

2016/0353440 A1* 12/2016 Lee ................... H04W 72/0453
2023/0124792 A1*  4/2023 Deghel ................ H04W 72/02
                                                        370/329

* cited by examiner

*Primary Examiner* — Brian P Cox
(74) *Attorney, Agent, or Firm* — Patterson & Sheridan LLP

(57) ABSTRACT

Certain aspects of the present disclosure provide a method for wireless communication by a user equipment (UE). The UE receives, from a network entity, after transmitting at least a first repetition of a physical uplink control channel (PUCCH) transmission according to a first repetition factor, a dynamic indication of a second repetition factor to apply for transmitting the same PUCCH transmission. The UE determines an application time of the second repetition factor based on at least a timing of a last complete or partial transmission instance of the PUCCH transmission. The UE transmits, to the network entity, one or more additional repetitions of the PUCCH transmission based, at least in part, on the determined application time of the second repetition factor.

30 Claims, 10 Drawing Sheets

ACTIVATION INSTANCE FOR DYNAMIC INDICATION OF PUCCH REPETITION FACTOR

CROSS-REFERENCE TO RELATED APPLICATION

This application claims benefit of and priority to U.S. Provisional Application No. 63/186,481, filed May 10, 2021, which is hereby incorporated by reference in its entirety.

FIELD OF THE DISCLOSURE

Aspects of the present disclosure relate to wireless communications, and more particularly, to techniques for managing physical uplink control channel (PUCCH) transmission repetitions.

BACKGROUND

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for managing physical uplink control channel (PUCCH) transmission repetitions when a new PUCCH repetition factor is dynamically indicated.

Certain aspects provide a method of wireless communications by a user equipment (UE). The method generally includes receiving, from a network entity, after transmitting at least a first repetition of a PUCCH transmission according to a first repetition factor, a dynamic indication of a second repetition factor to apply for transmitting the same PUCCH transmission; determining an application time of the second repetition factor based on at least a timing of a last complete or partial transmission instance of the PUCCH transmission; and transmitting, to the network entity, one or more additional repetitions of the PUCCH transmission based, at least in part, on the determined application time of the second repetition factor.

Certain aspects provide a method of wireless communications by a network entity. The method generally includes sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission; and receiving, from the UE, one or more additional repetitions of the PUCCH transmission based, at least in part, on the application time of the second repetition factor.

Certain aspects provide an apparatus for wireless communications by a UE. The apparatus generally includes a memory comprising computer-executable instructions; and a processor configured to execute the computer-executable instructions and cause the apparatus to: receive, from a network entity, after transmitting at least a first repetition of a PUCCH transmission according to a first repetition factor, a dynamic indication of a second repetition factor to apply for transmitting the same PUCCH transmission; determine an application time of the second repetition factor based on at least a timing of a last complete or partial transmission instance of the PUCCH transmission; and transmit, to the network entity, one or more additional repetitions of the PUCCH transmission based, at least in part, on the determined application time of the second repetition factor.

Certain aspects provide an apparatus for wireless communications by a network entity. The apparatus generally includes a memory comprising computer-executable instructions; and a processor configured to execute the computer-executable instructions and cause the apparatus to: send, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission; and receive, from the UE, one or more additional repetitions of the PUCCH transmission based, at least in part, on the application time of the second repetition factor.

Certain aspects provide an apparatus for wireless communications. The apparatus generally includes means for receiving, from a network entity, after transmitting at least a first repetition of a PUCCH transmission according to a first repetition factor, a dynamic indication of a second repetition factor to apply for transmitting the same PUCCH transmission; means for determining an application time of the second repetition factor based on at least a timing of a last complete or partial transmission instance of the PUCCH transmission; and means for transmitting, to the network entity, one or more additional repetitions of the PUCCH transmission based, at least in part, on the determined application time of the second repetition factor.

Certain aspects provide an apparatus for wireless communications. The apparatus generally includes means for sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission; and means for receiving, from the UE, one or more additional repetitions of the PUCCH transmission based, at least in part, on the application time of the second repetition factor.

Certain aspects of the subject matter described in this disclosure can be implemented in a computer readable medium storing computer executable code thereon for wireless communications. The computer readable medium comprises code for receiving, from a network entity, after transmitting at least a first repetition of a PUCCH transmission according to a first repetition factor, a dynamic indication of a second repetition factor to apply for transmitting the same PUCCH transmission; code for determining an application time of the second repetition factor based on at least a timing of a last complete or partial transmission instance of the PUCCH transmission; and code for transmitting, to the network entity, one or more additional repetitions of the PUCCH transmission based, at least in part, on the determined application time of the second repetition factor.

Certain aspects of the subject matter described in this disclosure can be implemented in a computer readable medium storing computer executable code thereon for wireless communications. The computer readable medium comprises code for sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission; and code for receiving, from the UE, one or more additional repetitions of the PUCCH transmission based, at least in part, on the application time of the second repetition factor.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
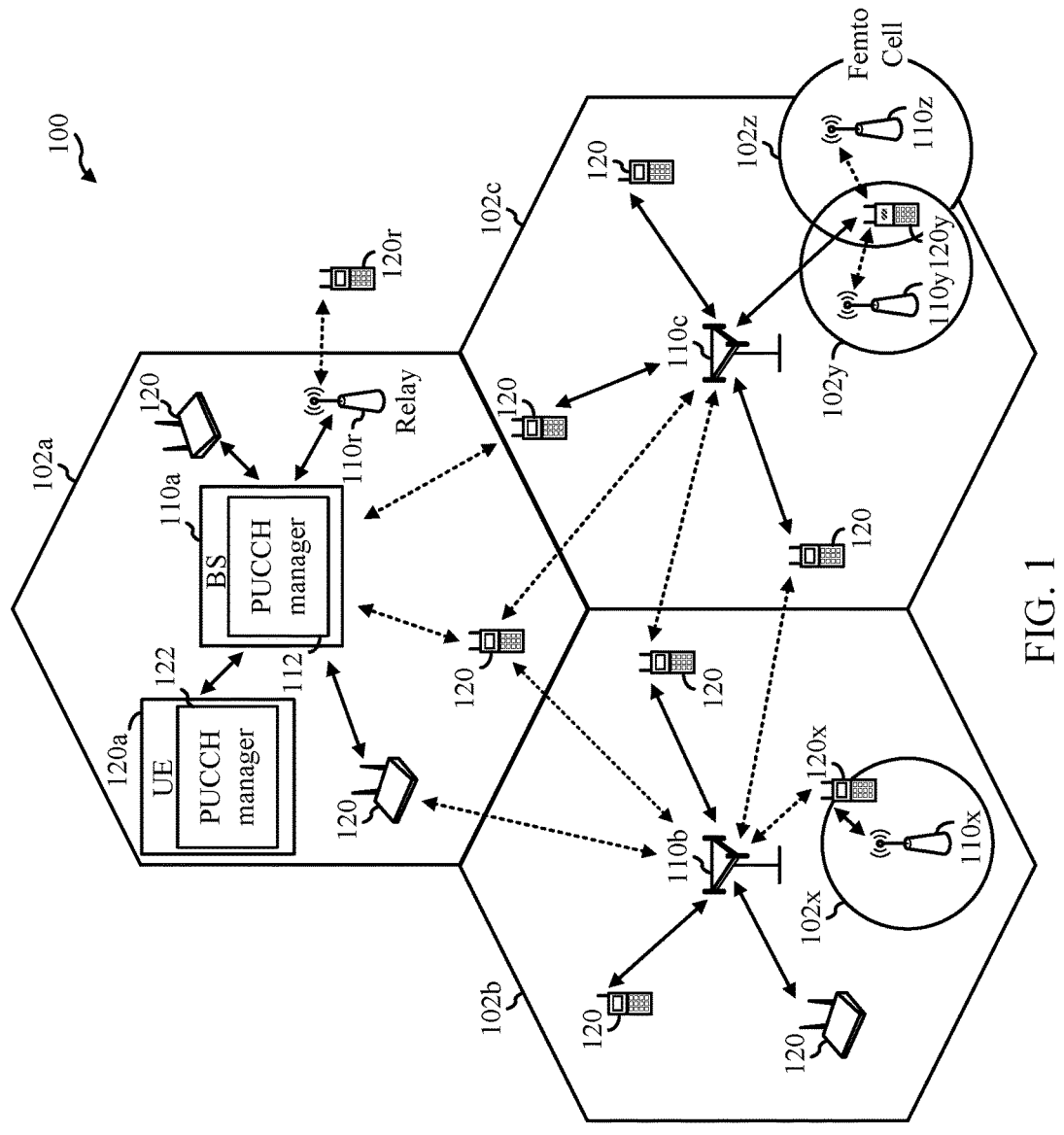
FIG. 1 is a block diagram conceptually illustrating an example wireless communication network, in accordance with certain aspects of the present disclosure.
Figure 1:
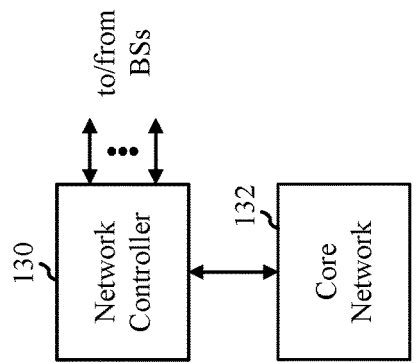

In some cases, a user equipment (UE) may receive an indication of a new physical uplink control channel (PUCCH) repetition factor (e.g., four repetitions) from a network entity. The UE may receive this indication during two repetitions of a PUCCH transmission based on an earlier PUCCH repetition factor (e.g., two repetitions). In such cases, the UE does not know how to apply the new PUCCH repetition factor for sending PUCCH transmission repetitions, based on the new PUCCH repetition factor to the network entity.

Aspects of the present disclosure provide apparatuses, methods, processing systems, and computer readable mediums for determining a starting instance for an application of a new PUCCH repetition factor indicated to a UE for sending repetitions of a PUCCH transmission to a network entity. In one example, the new PUCCH repetition factor is applied starting from a PUCCH transmission instance (e.g., from PUCCH transmissions associated with a dynamic indication of the new PUCCH repetition factor) after a last instance of the PUCCH transmission that is completely or partially transmitted before a time of indication of the new PUCCH repetition factor. In another example, the new PUCCH repetition factor is applied starting from a first PUCCH transmission instance (e.g., from the PUCCH transmissions associated with the dynamic indication of the new PUCCH repetition factor) that is not completely transmitted before the time of indication of the new PUCCH repetition factor.

In some aspects, a technique for an application of a repetition factor to an uplink (UL) control channel is provided. For example, a UL control channel repetition factor is applied for the UL control channel unassociated with a downlink control information (DCI) carrying the UL control channel repetition factor (referred to herein as an "unassociated UL control channel" or "other UL control channel") depending on a timing of a last completely or partially transmitted instance of the UL control channel. The unassociated UL control channel is a PUCCH transmission carrying acknowledgement (ACK) or negative ACK (NACK) feedback for a semi-persistent scheduled (SPS) physical downlink shared channel (PDSCH) or a PUCCH transmission carrying periodic channel state information (CSI)). The UL control channel is considered unassociated with the DCI if the DCI does not schedule the UL control channel.

The following description provides examples of managing PUCCH transmission repetitions in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing physical uplink control channel (PUCCH) repetitions. As shown in FIG. 1, a UE 120a includes a PUCCH manager 122 configured to perform operations 400 of FIG. 4, and a BS 110a includes a PUCCH manager 112 configured to perform operations 500 of FIG. 5.

The wireless communication network 100 may be a new radio (NR) system (e.g., a 5$^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 10:
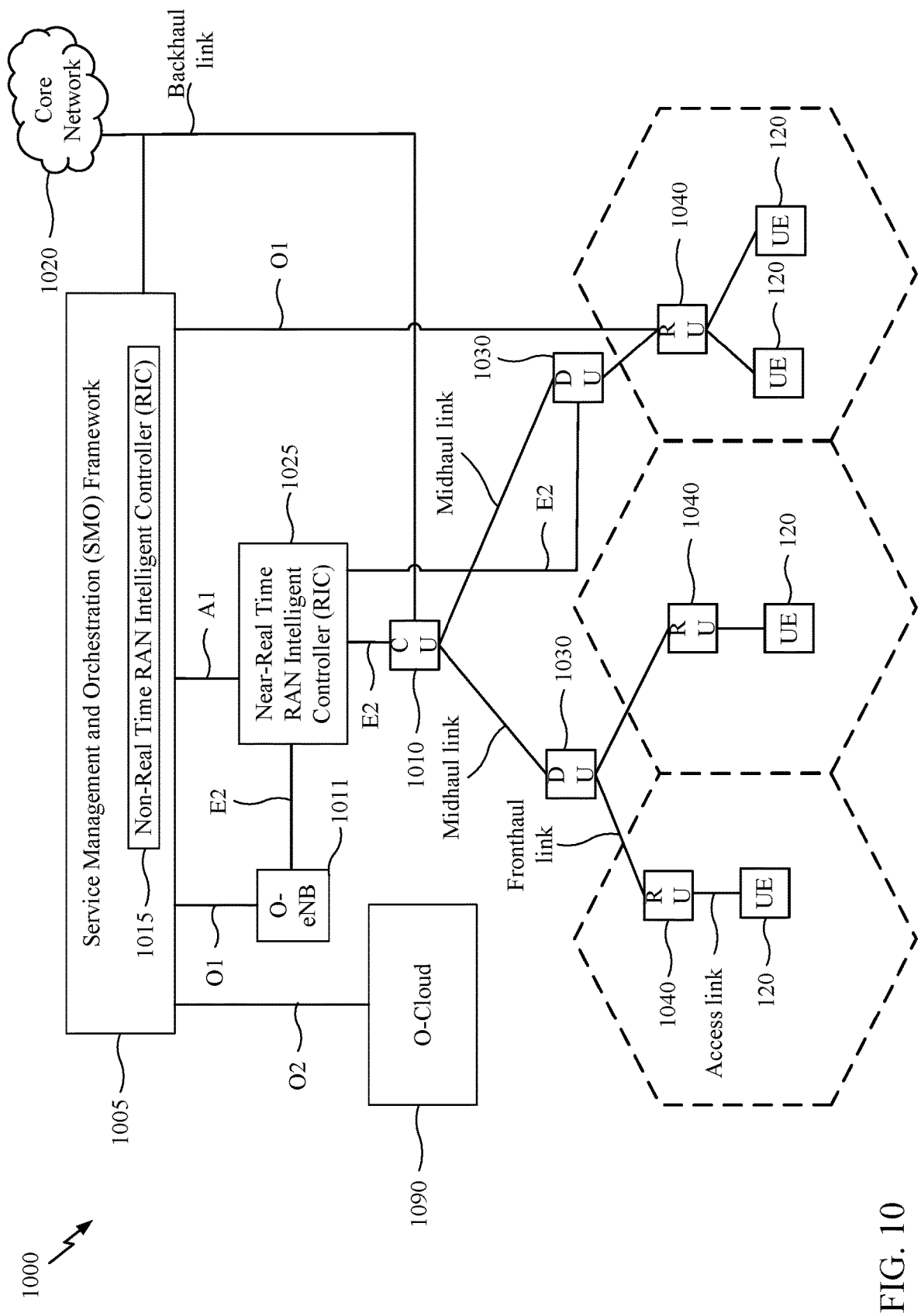
FIG. 10 depicts an example disaggregated BS architecture.

In various aspects, a BS 110 (or a network node) can be implemented as an aggregated BS, a disaggregated BS, an integrated access and backhaul (IAB) node, a relay node, or a sidelink node, to name a few examples. FIG. 10, discussed in further detail later in this disclosure, depicts an example disaggregated BS architecture.

Figure 2:
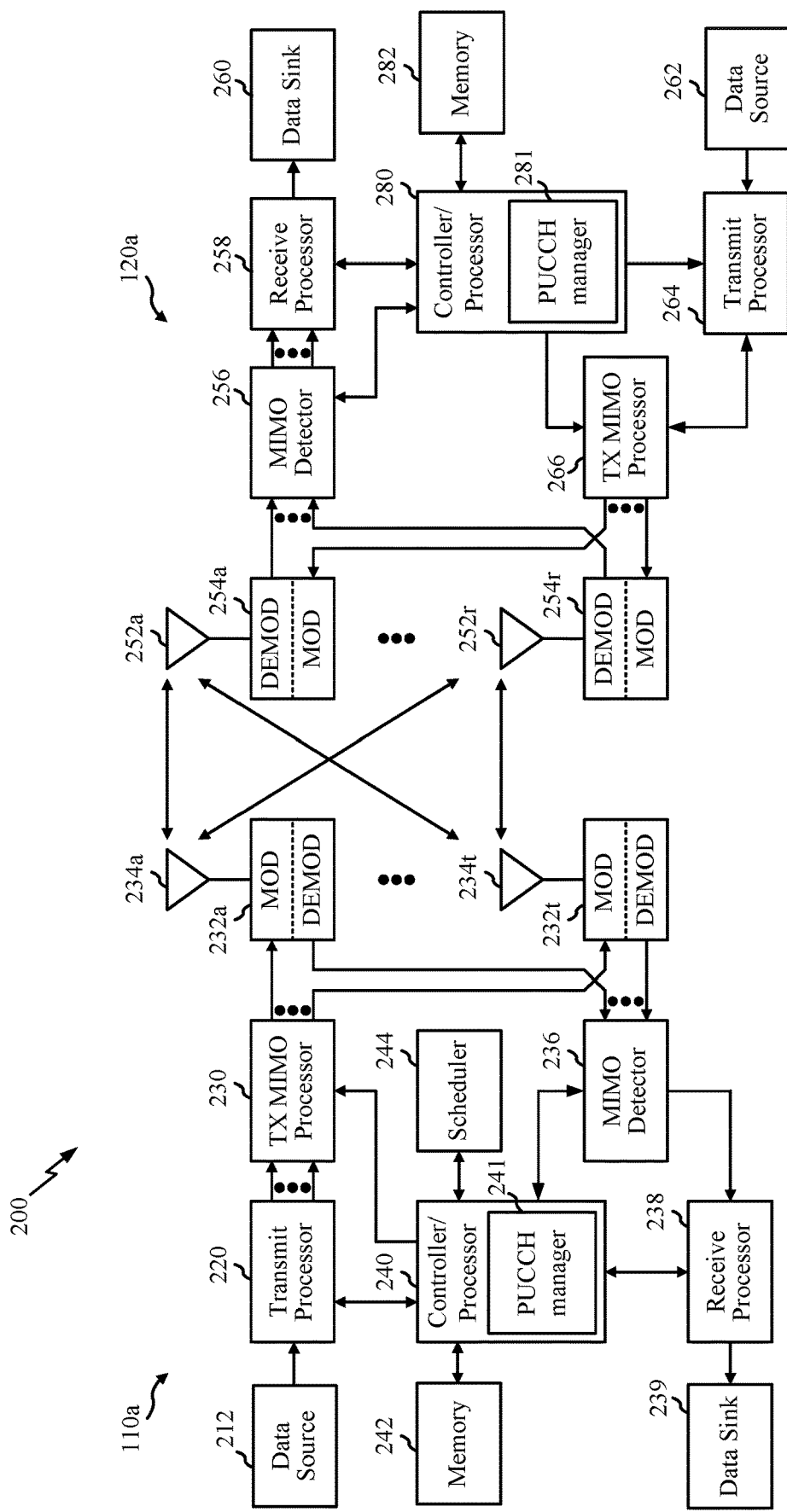
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PUCCH manager 241 that may be configured to perform the operations illustrated in FIG. 5, as well as other operations disclosed herein. As shown in FIG. 2, the controller/processor 280 of the UE 120a has a PUCCH manager 281 that may be configured to perform the operations illustrated in FIG. 4, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
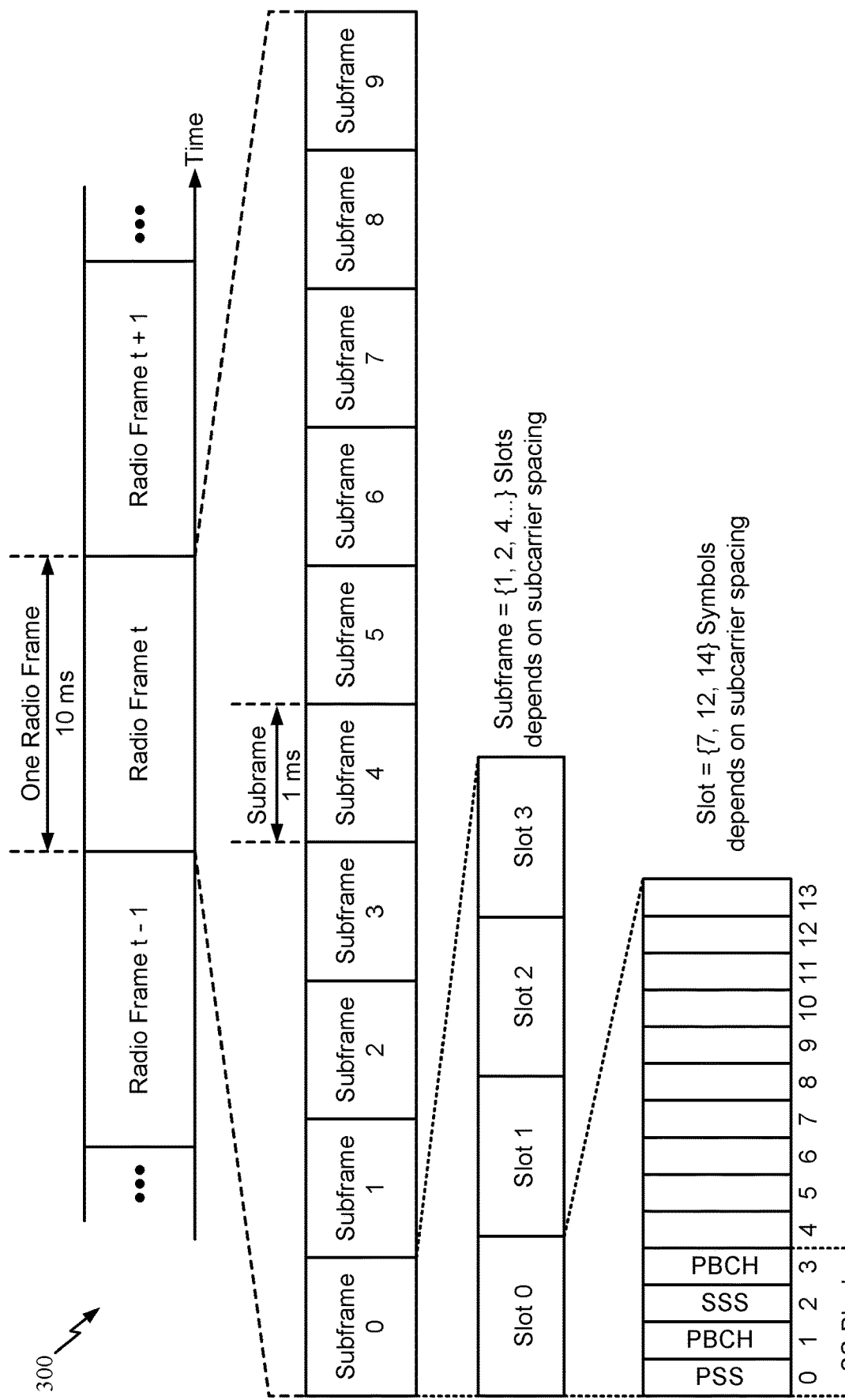
FIG. 3 is an example frame format for certain wireless communication systems (e.g., a new radio (NR) system), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Activation Instance for Dynamic Indication of PUCCH Repetition Factor

In certain wireless communication systems (e.g., $5^{th}$ generation (5G) new radio (NR)), multiple coverage enhancement mechanisms for an uplink (UL) control channel (e.g., a physical uplink control channel (PUCCH)) are provided.

In some cases, a signaling mechanism is implemented to support a dynamic indication of a PUCCH repetition factor to a user equipment (UE). In some cases, a mechanism is implemented to support demodulation reference signal (DMRS) bundling across PUCCH repetitions to enhance coverage. DMRS bundling refers to sending same or coherent DMRS in multiple time slots for coverage enhancement. This may allow the UE to perform a joint channel estimation on the DMRS in multiple time slots to improve the accuracy.

In some cases, a PUCCH repetition factor indicates whether a PUCCH is transmitted with repetition and, if so, a number of PUCCH repetitions. The PUCCH repetition factor may be explicitly or implicitly indicated to the UE via a downlink control information (DCI) that schedules a physical downlink shared channel (PDSCH). For example, the dynamic indication of the PUCCH repetition factor is achieved by configured repetition per PUCCH resource set and the dynamic indication of a PUCCH resource indicator (PUCCH RI (PRI)) via the DCI that schedules the PDSCH. The PRI of the scheduling DCI may indicate the PUCCH resource set configured for the repetition, and the PUCCH resource set may be mapped to the PUCCH for which the PUCCH repetition factor has to be applied.

In some cases, a PUCCH repetition factor explicitly or implicitly indicated in a DCI configures a repetition of a PUCCH scheduled separately from the DCI. The PUCCH unassociated with the DCI may be referred as an "unassociated PUCCH" or "other PUCCH". In one example, the unassociated PUCCH may carry acknowledgement (ACK) or negative ACK (NACK) for a downlink (DL) data channel configured using a semi-persistent scheduling (SPS). In another example, the unassociated PUCCH may carry periodic channel state information (CSI). In another example, the unassociated PUCCH may include a PUCCH carrying a scheduling request (SR).

In some cases, since a PUCCH for which a PUCCH repetition factor has to be applied is not associated with a DCI, a processing time for the PUCCH repetition factor is defined to ensure that a UE has enough time to decode the PUCCH repetition factor and implement the repetition for an unassociated PUCCH. For example, dynamic scheduling timing, K0, is an offset between a DL slot where a physical downlink control channel (PDCCH) carrying the DCI for DL scheduling is received and the DL slot where PDSCH data is scheduled. The UE may not be required to decode the DCI until time K0, and the UE may not be aware of the PUCCH repetition factor to apply to another PUCCH until time K0. However, if there is the PUCCH in the same time slot for which the PUCCH repetition factor is to be applied, the UE may not have enough time to implement repetition for the PUCCH, and in some cases, may not be aware that the PUCCH repetition factor has to be applied to this PUCCH. Accordingly, the PUCCH repetition factor may be applied to the unassociated PUCCH based on predefined processing rules and parameters.

In some cases, a UE may receive an indication of a new PUCCH repetition factor (e.g., four repetitions) from a network entity during two repetitions of a PUCCH based on an earlier PUCCH repetition factor (e.g., two repetitions). In such cases, the UE does not know how to apply the new PUCCH repetition factor for sending PUCCH repetitions based on the new PUCCH repetition factor to the network entity.

Aspects of the present disclosure provide apparatuses, methods, processing systems, and computer readable mediums for determining a starting instance for an application of a new PUCCH repetition factor indicated to a UE for sending repetitions of PUCCH transmission to a network entity. A number of repetitions of the PUCCH transmission based on the new PUCCH repetition factor will vary depending on the determined starting instance for the application of the new PUCCH repetition factor.

Figure 4:
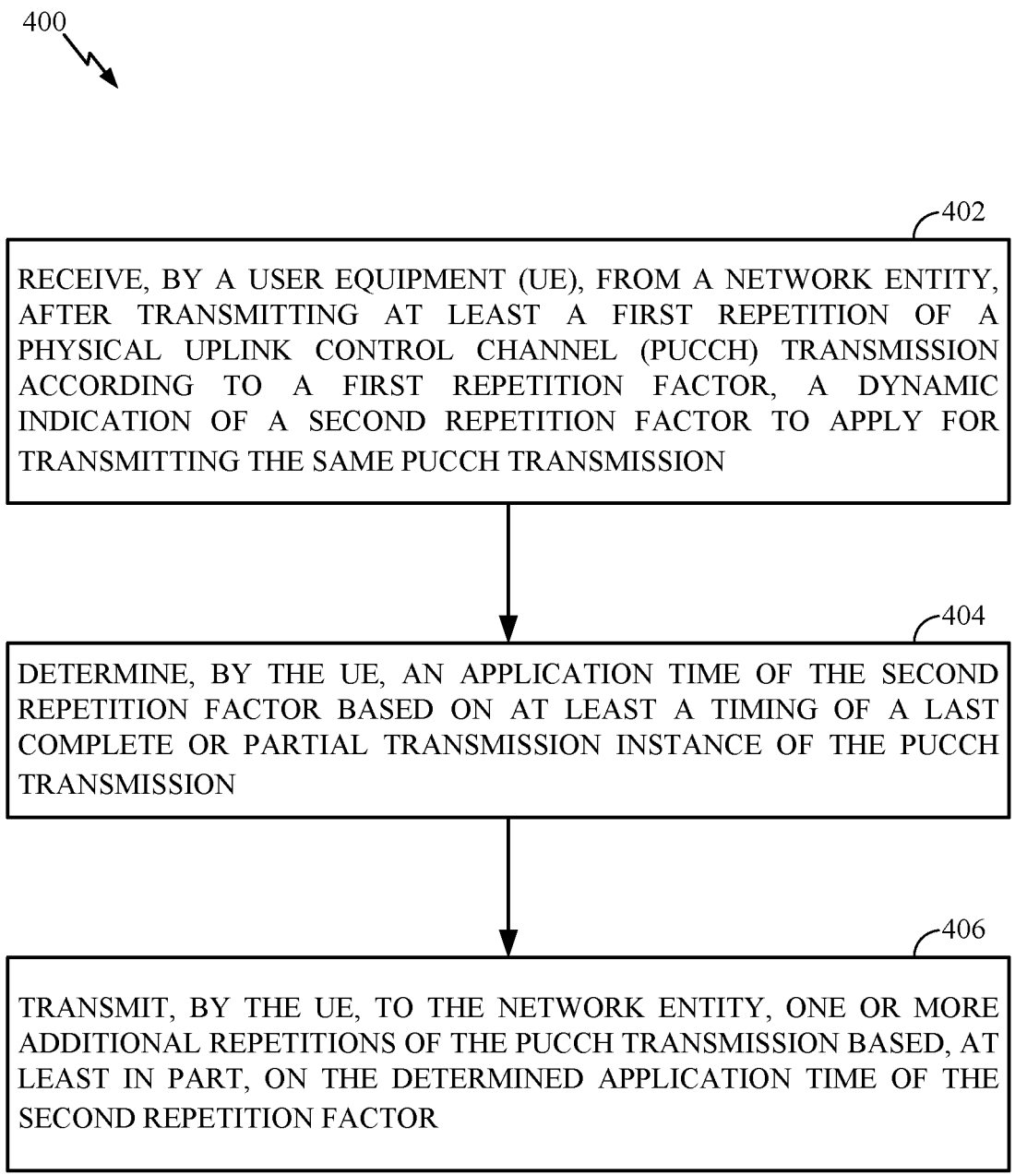
FIG. 4 is a flow diagram illustrating example operations for wireless communication by a UE, in accordance with certain aspects of the present disclosure.

FIG. 4 is a flow diagram illustrating example operations 400 for wireless communication by a UE, in accordance with certain aspects of the present disclosure. The operations 400 may be performed, for example, by the UE 120a in the wireless communication network 100. The operations 400 may be implemented as software components that are executed and run on one or more processors (e.g., the controller/processor 280 of FIG. 2). Further, the transmission and reception of signals by the UE in operations 400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 400 begin, at 402, by receiving, from a network entity, after transmitting at least a first repetition of a PUCCH transmission according to a first repetition factor, a dynamic indication of a second repetition factor to apply for transmitting the same PUCCH transmission. For example, the UE may receive the dynamic indication of the second repetition factor using antenna(s) and receiver/transceiver components of the UE 120a shown in FIG. 1 or FIG. 2 and/or of the apparatus shown in FIG. 8.

At 404, the UE determines an application time of the second repetition factor based on at least a timing of a last complete or partial transmission instance of the PUCCH transmission. For example, the UE may determine the application time of the second repetition factor using a processor of the UE 120a shown in FIG. 1 or FIG. 2 and/or of the apparatus shown in FIG. 8.

At 406, the UE transmits to the network entity one or more additional repetitions of the PUCCH transmission based, at least in part, on the determined application time of the second repetition factor. For example, the UE may transmit the one or more additional repetitions of the PUCCH transmission using antenna(s) and transmitter/transceiver components of the UE 120a shown in FIG. 1 or FIG. 2 and/or of the apparatus shown in FIG. 8.

Figure 5:
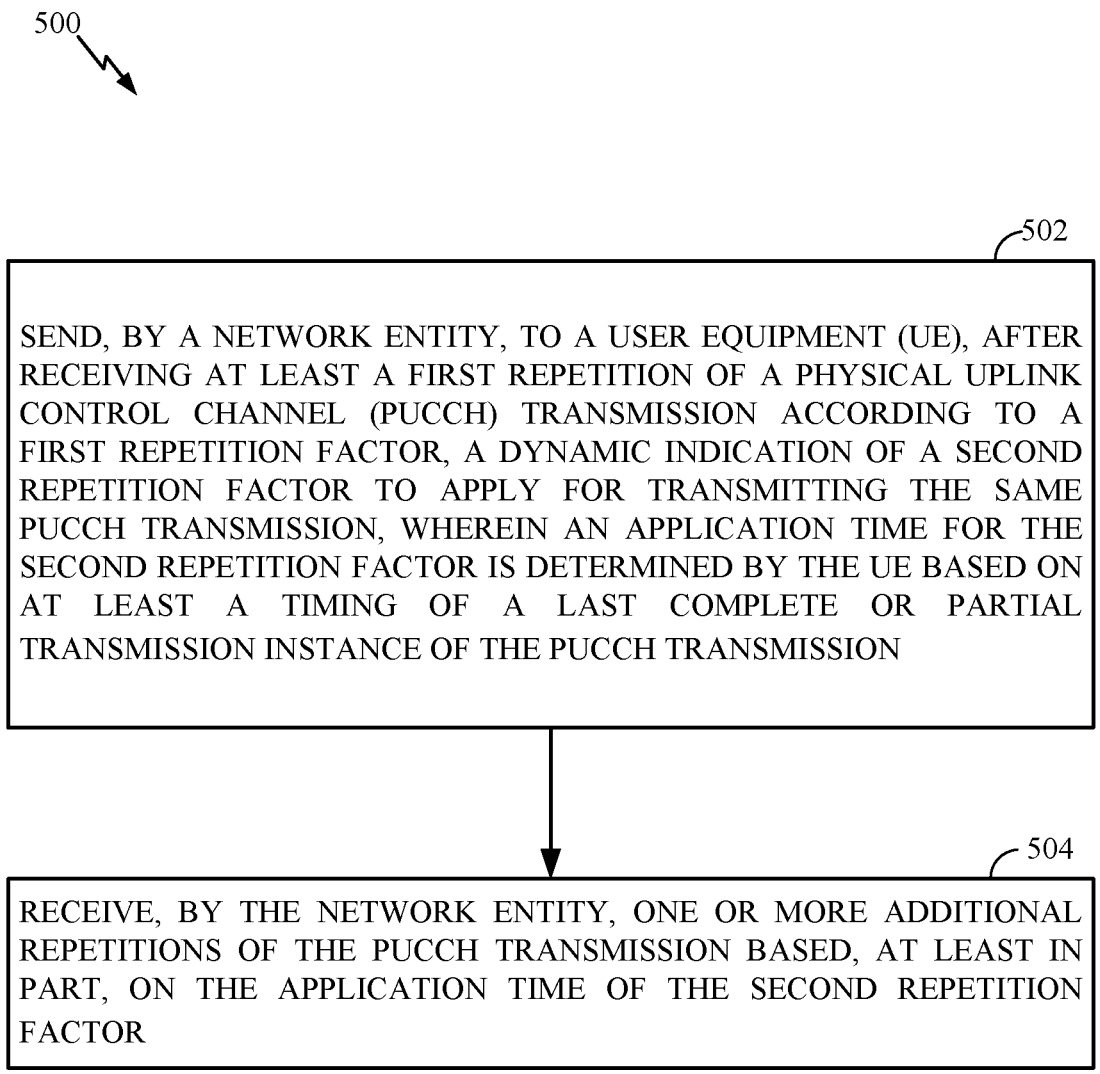
FIG. 5 is a flow diagram illustrating example operations for wireless communication by a network entity, in accordance with certain aspects of the present disclosure.

FIG. 5 is a flow diagram illustrating example operations 500 that may be considered complementary to operations 400 of FIG. 4. For example, the operations 500 may be performed by a network entity (e.g., such as the BS 110a in the wireless communication network 100). The operations 500 may be implemented as software components that are executed and run on one or more processors (e.g., the controller/processor 240 of FIG. 2). Further, the transmission and reception of signals by the network entity in operations 500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 500 begin, at 502, by sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission. For example, the network entity may send the dynamic indication of the second repetition factor using antenna(s) and transmitter/transceiver components of the BS 110a shown in FIG. 1 or FIG. 2 and/or of the apparatus shown in FIG. 9.

At 504, the network entity receives one or more additional repetitions of the PUCCH transmission based, at least in part, on the application time of the second repetition factor. For example, the network entity may receive the one or more additional repetitions of the PUCCH transmission using antenna(s) and receiver/transceiver components of the BS 110a shown in FIG. 1 or FIG. 2 and/or of the apparatus shown in FIG. 9.

Figure 6:
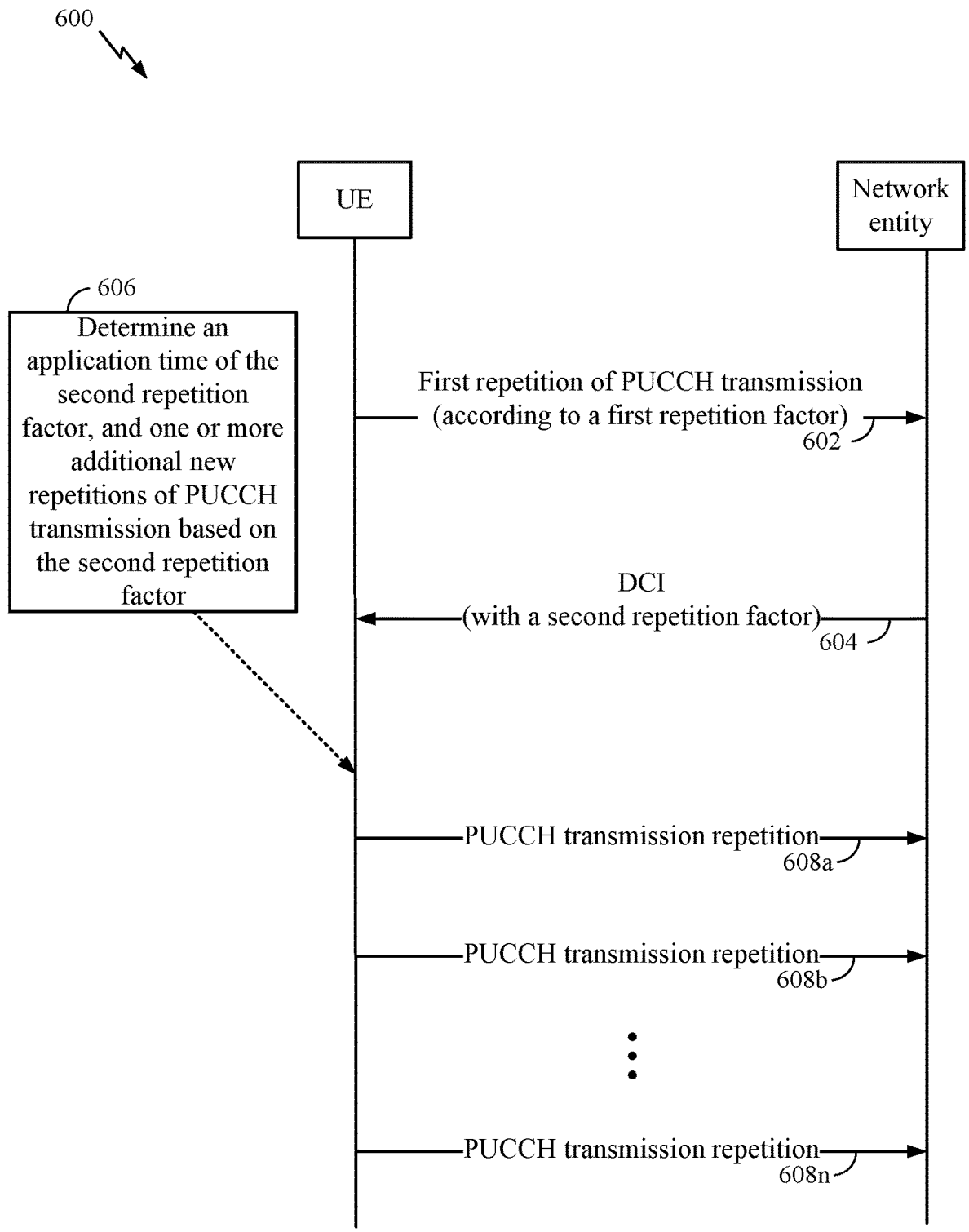
FIG. 6 is a call flow diagram illustrating example signaling for managing physical uplink control channel (PUCCH) transmission repetitions, in accordance with certain aspects of the present disclosure.
Figure 7:
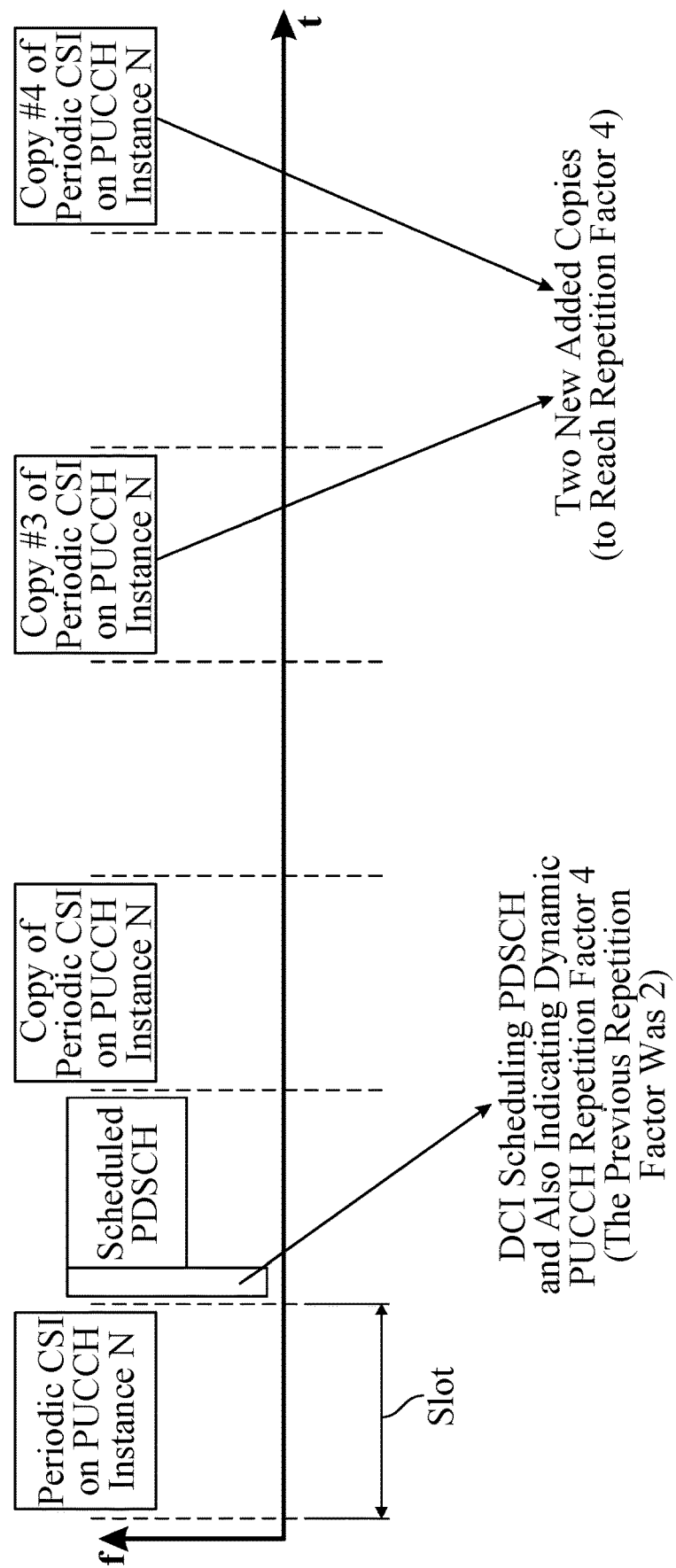
FIG. 7 illustrates an example scenario for an activation instance for a dynamic indication of a PUCCH repetition factor, in accordance with certain aspects of the present disclosure.

The operations shown in FIGS. 4 and 5 may be understood with reference to FIGS. 6 and 7.

As illustrated in FIG. 6, at 602, a UE (e.g., the UE 120a shown in FIG. 1 or FIG. 2) sends a first repetition of a PUCCH transmission according to a first repetition factor to a network entity (e.g., the BS 110a shown in FIG. 1 or FIG. 2). The first repetition factor indicates a first number of repetitions (e.g., two repetitions) of the PUCCH transmission to the network entity.

In certain aspects, the PUCCH transmission carries acknowledgment (ACK) for a downlink (DL) data channel configured using semi-persistent scheduling (SPS). In certain aspects, the PUCCH transmission carries negative ACK (NACK) for the DL data channel configured using the SPS. In certain aspects, the PUCCH transmission carries periodic channel state information (CSI).

At 604, the network entity sends a downlink control information (DCI) to the UE that indicates a second repetition factor to apply for transmitting the same PUCCH transmission. The second repetition factor indicates a second number of repetitions (e.g., four repetitions) of the PUCCH transmission to the network entity. As illustrated, the DCI could also schedule a physical downlink shared channel (PDSCH).

At 606, the UE determines an application time for applying the second repetition factor for transmitting the PUCCH transmission. In certain aspects, the UE determines the application time based on a timing of a last complete or partial transmission instance of the PUCCH transmission according to the first repetition factor. For example, the UE determines the application time based on a timing of a last complete or partial transmission of any instance of the PUCCH transmission, including a repetition of the original PUCCH transmission. The UE then determines a number of additional repetitions of the PUCCH transmission based on the determined application time of the second repetition factor.

At 608a-608n, the UE transmits the determined number of additional repetitions of the PUCCH transmission to the network entity.

In certain aspects, the application time for applying the second repetition factor starts from a transmission of the PUCCH transmission, after the last complete or partial transmission of the PUCCH transmission, before a time of the indication of the second repetition factor.

For example, when the DCI carrying the second repetition factor (of four repetitions) is arrived between two repetitions of the PUCCH transmission based on the first repetition factor (of two repetitions), four new repetitions of the PUCCH transmission are applied from a next PUCCH instance (after finishing transmission of a current instance with the two repetitions of the PUCCH transmission). Accordingly, after the two repetitions of the PUCCH transmission based on the first repetition factor, four more repetitions of the PUCCH transmission are sent based on the second repetition factor.

In certain aspects, the application time for applying the second repetition factor starts from a first instance of the PUCCH transmission that is only partially (or not fully) transmitted prior to a receipt of the indication of the second repetition factor.

For example, as illustrated in FIG. 7, when the DCI carrying the second repetition factor (of four repetitions) is arrived between two repetitions of the PUCCH transmission based on the first repetition factor (of two repetitions), the second repetition factor may be applied starting from a first PUCCH instance. Accordingly, two new repetitions of the PUCCH transmission are added to two repetitions of the PUCCH transmission that were already expected based on the first repetition factor to reach four PUCCH transmission repetitions as per the second repetition factor.

In certain aspects, the time of the indication of the second repetition factor corresponds to a beginning time of the DCI received by the UE indicating the second repetition factor. In certain aspects, the time of the indication of the second repetition factor corresponds to an ending time of the DCI received by the UE indicating the second repetition factor.

In certain aspects, the time of the indication of the second repetition factor corresponds to a beginning time of the DCI received by the UE indicating the second repetition factor and a time offset (e.g., a processing time of the DCI by the UE). In certain aspects, the time of the indication of the second repetition factor corresponds to an ending time of the DCI received by the UE indicating the second repetition factor and the time offset.

Example Wireless Communication Devices

Figure 8:
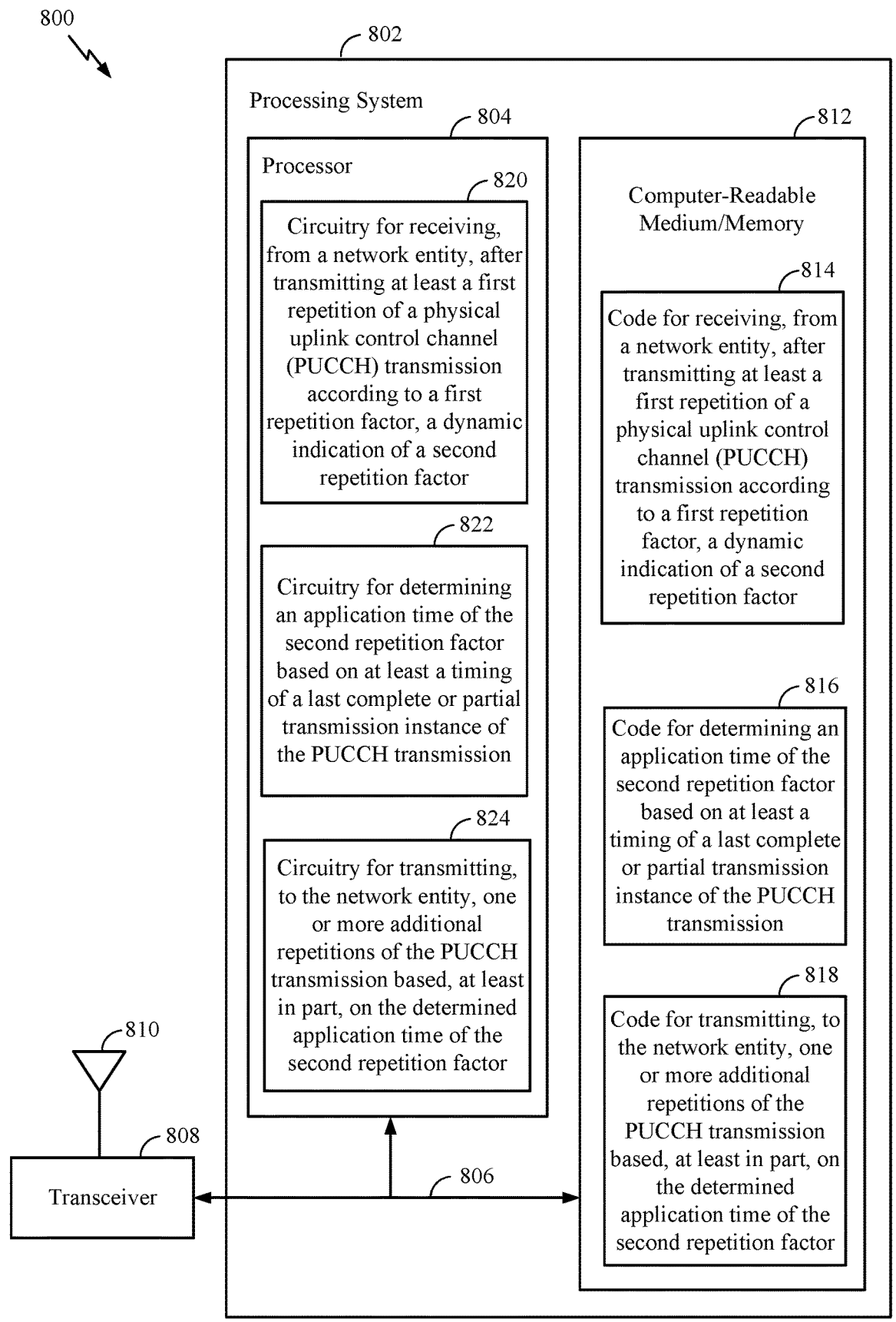
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 is configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., a computer-executable code) that when executed by the processor 804, cause the processor 804 to perform the operations illustrated in FIG. 4, or other operations for performing the various techniques discussed herein. In certain aspects, computer-readable medium/memory 812 stores code 814 for receiving, code 816 for determining, and code 818 for transmitting. The code 814 for receiving may include code for receiving, from a network entity, after transmitting at least a first repetition of a physical uplink control channel (PUCCH) transmission according to a first repetition factor, a dynamic indication of a second repetition factor to apply for transmitting the same PUCCH transmission. The code 816 for determining may include code for determining an application time of the second repetition factor based on at least a timing of a last complete or partial transmission instance of the PUCCH transmission. The code 818 for transmitting may include code for transmitting, to the network entity, one or more additional repetitions of the PUCCH transmission based, at least in part, on the determined application time of the second repetition factor.

The processor 804 may include circuitry configured to implement the code stored in the computer-readable medium/memory 812, such as for performing the operations illustrated in FIG. 4, as well as other operations for performing the various techniques discussed herein. For example, the processor 804 includes circuitry 820 for receiving, circuitry 822 for determining, and circuitry 824 for transmitting. The circuitry 820 for receiving may include circuitry for receiving, from a network entity, after transmitting at least a first repetition of a PUCCH transmission according to a first repetition factor, a dynamic indication of a second repetition factor to apply for transmitting the same PUCCH transmission. The circuitry 822 for determining may include circuitry for determining an application time of the second repetition factor based on at least a timing of a last complete or partial transmission instance of the PUCCH transmission. The circuitry 824 for transmitting may include circuitry for transmitting, to the network entity, one or more additional repetitions of the PUCCH transmission based, at least in part, on the determined application time of the second repetition factor.

Figure 9:
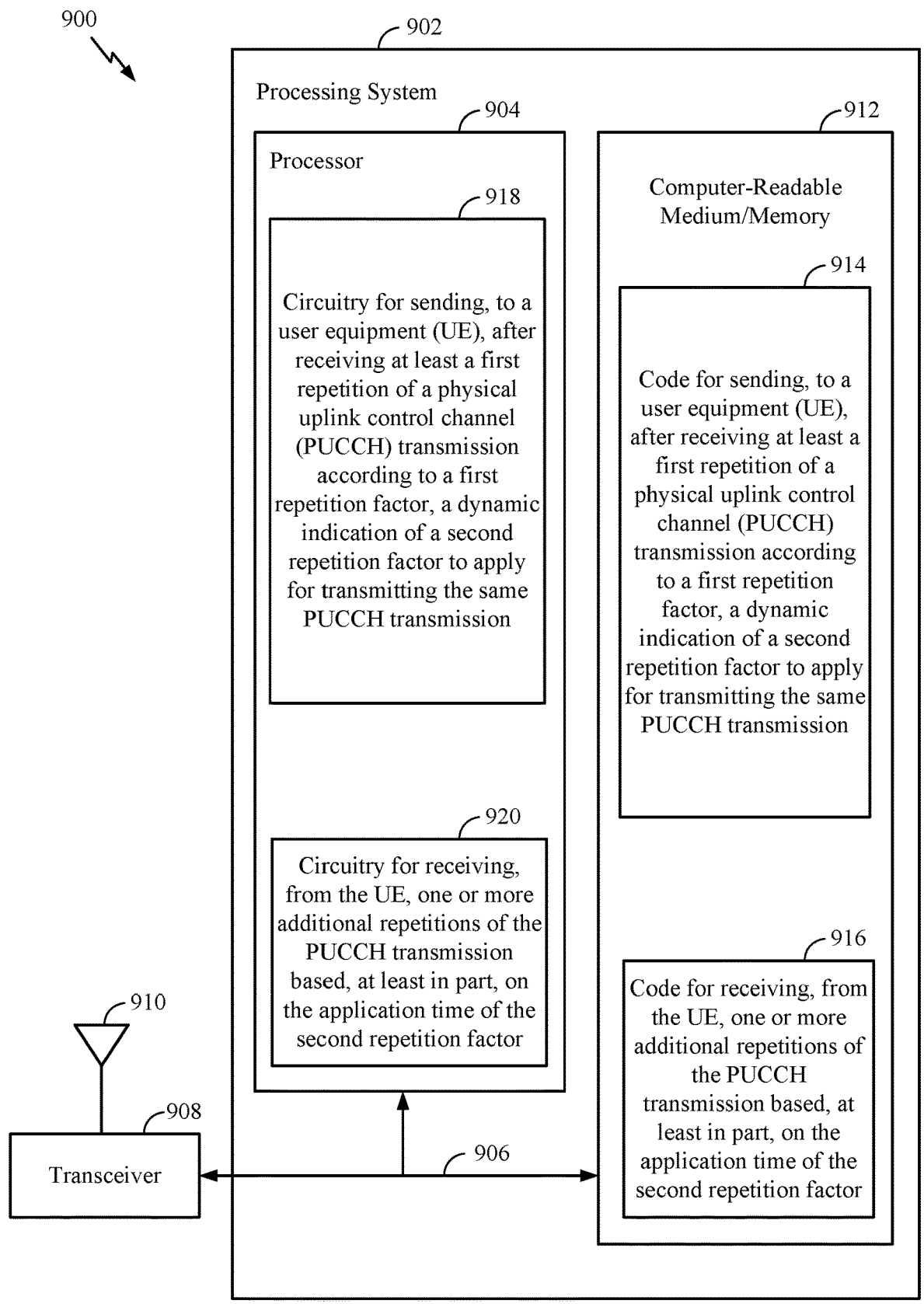
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 is configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., a computer-executable code) that when executed by the processor 904, cause the processor 904 to perform the operations illustrated in FIG. 5, or other operations for performing the various techniques discussed herein. In certain aspects, computer-readable medium/memory 912 stores code 914 for sending and code 916 for receiving. The code 914 for sending may include code for sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission. The code 916 for receiving may include code for receiving, from the UE, one or more additional repetitions of the PUCCH transmission based, at least in part, on the application time of the second repetition factor.

The processor 904 may include circuitry configured to implement the code stored in the computer-readable medium/memory 912, such as for performing the operations illustrated in FIG. 5, as well as other operations for performing the various techniques discussed herein. For example, the processor 904 includes circuitry 918 for sending and circuitry 920 for receiving. The circuitry 918 for sending may include circuitry for sending, to a UE, after receiving at least a first repetition of a PUCCH transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission. The circuitry 920 for receiving may include circuitry for receiving, from the UE, one or more additional repetitions of the PUCCH transmission based, at least in part, on the application time of the second repetition factor.

Example Disaggregated BS

FIG. 10 depicts an example disaggregated base station (BS) 1000 architecture. The disaggregated BS 1000 architecture may include one or more central units (CUs) 1010 that can communicate directly with a core network 1020 via a backhaul link, or indirectly with the core network 1020 through one or more disaggregated BS units (such as a Near-Real Time (Near-RT) RAN Intelligent Controller (MC) 1025 via an E2 link, or a Non-Real Time (Non-RT) RIC 1015 associated with a Service Management and Orchestration (SMO) Framework 1005, or both). A CU 1010 may communicate with one or more distributed units (DUs) 1030 via respective midhaul links, such as an F1 interface. The DUs 1030 may communicate with one or more radio units (RUs) 1040 via respective fronthaul links. The RUs 1040 may communicate with respective UEs 120 via one or more radio frequency (RF) access links. In some implementations, the UE 120 may be simultaneously served by multiple RUs 1040.

Each of the units, i.e., the CUs 1010, the DUs 1030, the RUs 1040, as well as the Near-RT RICs 1025, the Non-RT RICs 1015 and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (i.e., Central Unit-User Plane (CU-UP)), control plane functionality (i.e., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 1030 may further host one or more low PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC X25. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT MC 1015 from non-network data sources or from network functions. In some examples, the Non-RT MC 1015 or the Near-RT MC 1025 may be configured to tune RAN behavior or performance. For example, the Non-RT MC 1015 may monitor long-term trends and patterns for performance and employ AI/ML models to perform corrective actions through the SMO Framework 1005 (such as reconfiguration via O1) or via creation of RAN management policies (such as A1 policies).

Example Aspects

Implementation examples are described in the following numbered aspects.

In a first aspect, a method for wireless communication by a user equipment (UE), comprising: receiving, from a network entity, after transmitting at least a first repetition of a physical uplink control channel (PUCCH) transmission according to a first repetition factor, a dynamic indication of a second repetition factor to apply for transmitting the same PUCCH transmission; determining an application time of the second repetition factor based on at least a timing of a last complete or partial transmission instance of the PUCCH transmission; and transmitting, to the network entity, one or more additional repetitions of the PUCCH transmission based, at least in part, on the determined application time of the second repetition factor In a second aspect, alone or in combination with the first aspect, the application time starts from a transmission of the PUCCH transmission, after the last complete or partial transmission instance of the PUCCH transmission, before a time of the dynamic indication.

In a third aspect, alone or in combination with one or more of the first and second aspects, the application time starts from a first instance of the PUCCH transmission that is only partially transmitted prior to a receipt of the dynamic indication.

In a fourth aspect, alone or in combination with one or more of the first through third aspects, the second repetition factor is indicated to the UE via a downlink control information (DCI).

In a fifth aspect, alone or in combination with one or more of the first through fourth aspects, a time of the dynamic indication corresponds to a beginning time of the DCI indicating the second repetition factor.

In a sixth aspect, alone or in combination with one or more of the first through fifth aspects, a time of the dynamic indication corresponds to an ending time of the DCI indicating the second repetition factor.

In a seventh aspect, alone or in combination with one or more of the first through sixth aspects, a time of the dynamic indication corresponds to a beginning time of the DCI indicating the second repetition factor and a time offset for a processing time of the DCI.

In an eighth aspect, alone or in combination with one or more of the first through seventh aspects, a time of the dynamic indication corresponds to an ending time of the DCI indicating the second repetition factor and a time offset for a processing time of the DCI.

In a ninth aspect, alone or in combination with one or more of the first through eighth aspects, the PUCCH transmission carries acknowledgment (ACK) or negative ACK (NACK) for a downlink data channel configured using semi-persistent scheduling (SPS).

In a tenth aspect, alone or in combination with one or more of the first through ninth aspects, the PUCCH transmission carries periodic channel state information (CSI).

In an eleventh aspect, a method for wireless communication by a network entity, comprising: sending, to a user equipment (UE), after receiving at least a first repetition of a physical uplink control channel (PUCCH) transmission according to a first repetition factor, a dynamic indication of a second repetition factor to apply for transmitting the same PUCCH transmission, wherein an application time for the second repetition factor is determined by the UE based on at least a timing of a last complete or partial transmission instance of the PUCCH transmission; and receiving, from the UE, one or more additional repetitions of the PUCCH transmission based, at least in part, on the application time of the second repetition factor.

In a twelfth aspect, alone or in combination with the eleventh aspect, the application time starts from a transmission of the PUCCH transmission, after the last complete or partial transmission instance of the PUCCH transmission, before a time of the dynamic indication.

In a thirteenth aspect, alone or in combination with one or more of the eleventh and twelfth aspects, the application time starts from a first instance of the PUCCH transmission that is only partially transmitted prior to a receipt of the dynamic indication.

In a fourteenth aspect, alone or in combination with one or more of the eleventh through thirteenth aspects, the second repetition factor is indicated to the UE via a downlink control information (DCI).

In a fifteenth aspect, alone or in combination with one or more of the eleventh through fourteenth aspects, a time of the dynamic indication corresponds to a beginning time of the DCI indicating the second repetition factor.

In a sixteenth aspect, alone or in combination with one or more of the eleventh through fifteenth aspects, a time of the dynamic indication corresponds to an ending time of the DCI indicating the second repetition factor.

In a seventeenth aspect, alone or in combination with one or more of the eleventh through sixteenth aspects, a time of the dynamic indication corresponds to a beginning time of the DCI indicating the second repetition factor and a time offset for a processing time of the DCI.

In an eighteenth aspect, alone or in combination with one or more of the eleventh through seventeenth aspects, a time of the dynamic indication corresponds to an ending time of the DCI indicating the second repetition factor and a time offset for a processing time of the DCI.

In a nineteenth aspect, alone or in combination with one or more of the eleventh through eighteenth aspects, the PUCCH transmission carries acknowledgment (ACK) or negative ACK (HACK) for a downlink data channel configured using semi-persistent scheduling (SPS).

In a twentieth aspect, alone or in combination with one or more of the eleventh through nineteenth aspects, the PUCCH transmission carries periodic channel state information (CSI).

An apparatus for wireless communication, comprising at least one processor; and a memory coupled to the at least one processor, the memory comprising code executable by the at least one processor to cause the apparatus to perform the method of any of the first through twentieth aspects.

An apparatus comprising means for performing the method of any of the first through twentieth aspects.

A computer readable medium storing computer executable code thereon for wireless communications that, when executed by at least one processor, cause an apparatus to perform the method of any of the first through twentieth aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a graphics processing unit (GPU), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving, from a network entity, after transmitting at least a first repetition of a physical uplink control channel (PUCCH) transmission according to a first repetition factor and prior to transmitting all repetitions of the PUCCH transmission according to the first repetition factor, a dynamic indication of a second repetition factor to apply for transmitting the same PUCCH transmission;
determining an application time of the second repetition factor based on at least a timing of a last complete or partial transmission instance of the PUCCH transmission; and
transmitting, to the network entity, one or more additional repetitions of the PUCCH transmission based, at least in part, on the determined application time of the second repetition factor.

2. The method of claim 1, wherein the application time starts from a transmission instance of the PUCCH transmission, after the last complete or partial transmission instance of the PUCCH transmission before a time of the dynamic indication.

3. The method of claim 1, wherein the application time starts from a first instance of the PUCCH transmission that is only partially transmitted prior to the receipt of the dynamic indication.

4. The method of claim 1, wherein the second repetition factor is indicated to the UE via a downlink control information (DCI).

5. The method of claim 4, wherein a time of the dynamic indication corresponds to:
   a beginning time of the DCI indicating at least one of: the second repetition factor or a time offset for a processing time of the DCI; or
   an ending time of the DCI indicating at least one of: the second repetition factor or the time offset for the processing time of the DCI.

6. The method of claim 1, wherein the PUCCH transmission carries an acknowledgment (ACK) or a negative ACK (NACK) for a downlink data channel configured using semi-persistent scheduling (SPS).

7. The method of claim 1, wherein the PUCCH transmission carries periodic channel state information (CSI).

8. A method for wireless communication by a network entity, comprising:
   sending, to a user equipment (UE), after receiving at least a first repetition of a physical uplink control channel (PUCCH) transmission according to a first repetition factor and prior to receiving all repetitions of the PUCCH transmission according to the first repetition factor, a dynamic indication of a second repetition factor to apply for transmitting the same PUCCH transmission, wherein an application time for the second repetition factor is based on at least a timing of a last complete or partial transmission instance of the PUCCH transmission; and
   receiving, from the UE, one or more additional repetitions of the PUCCH transmission based, at least in part, on the application time of the second repetition factor.

9. The method of claim 8, wherein the application time starts from a transmission instance of the PUCCH transmission, after the last complete or partial transmission instance of the PUCCH transmission before a time of the dynamic indication.

10. The method of claim 8, wherein the application time starts from a first instance of the PUCCH transmission that is only partially transmitted prior to the receipt of the dynamic indication.

11. The method of claim 8, wherein the second repetition factor is indicated to the UE via a downlink control information (DCI).

12. The method of claim 11, wherein a time of the dynamic indication corresponds to:
   a beginning time of the DCI indicating at least one of: the second repetition factor or a time offset for a processing time of the DCI; or
   an ending time of the DCI indicating at least one of: the second repetition factor or the time offset for the processing time of the DCI.

13. The method of claim 8, wherein the PUCCH transmission carries an acknowledgment (ACK) or a negative ACK (NACK) for a downlink data channel configured using semi-persistent scheduling (SPS).

14. The method of claim 8, wherein the PUCCH transmission carries periodic channel state information (CSI).

15. An apparatus for wireless communication by a user equipment (UE), comprising:
   a memory comprising instructions; and
   one or more processors, individually or collectively, configured to execute the instructions and cause the apparatus to:
      receive, from a network entity, after transmitting at least a first repetition of a physical uplink control channel (PUCCH) transmission according to a first repetition factor and prior to transmitting all repetitions of the PUCCH transmission according to the first repetition factor, a dynamic indication of a second repetition factor to apply for transmitting the same PUCCH transmission;
      determine an application time of the second repetition factor based on at least a timing of a last complete or partial transmission instance of the PUCCH transmission; and
      transmit, to the network entity, one or more additional repetitions of the PUCCH transmission based, at least in part, on the determined application time of the second repetition factor.

16. The apparatus of claim 15, wherein the application time starts from a transmission instance of the PUCCH transmission, after the last complete or partial transmission instance of the PUCCH transmission before a time of the dynamic indication.

17. The apparatus of claim 15, wherein the application time starts from a first instance of the PUCCH transmission that is only partially transmitted prior to the receipt of the dynamic indication.

18. The apparatus of claim 15, wherein the second repetition factor is indicated to the UE via a downlink control information (DCI).

19. The apparatus of claim 18, wherein a time of the dynamic indication corresponds to a beginning time of the DCI indicating the second repetition factor.

20. The apparatus of claim 18, wherein a time of the dynamic indication corresponds to an ending time of the DCI indicating the second repetition factor.

21. The apparatus of claim 18, wherein a time of the dynamic indication corresponds to:
   a beginning time of the DCI indicating the second repetition factor and a time offset for a processing time of the DCI; or
   an ending time of the DCI indicating the second repetition factor and the time offset for the processing time of the DCI.

22. The apparatus of claim 15, wherein the PUCCH transmission carries an acknowledgment (ACK) or a negative ACK (NACK) for a downlink data channel configured using semi-persistent scheduling (SPS).

23. The apparatus of claim 15, wherein the PUCCH transmission carries periodic channel state information (CSI).

24. An apparatus for wireless communication by a network entity, comprising:
   a memory comprising instructions; and
   one or more processors, individually or collectively, configured to execute the instructions and cause the apparatus to:
      send, to a user equipment (UE), after receiving at least a first repetition of a physical uplink control channel (PUCCH) transmission according to a first repetition factor and prior to receiving all repetitions of the PUCCH transmission according to the first repetition factor, a dynamic indication of a second repetition factor to apply for transmitting the same PUCCH transmission, wherein an application time for the second repetition factor is based on at least a timing of a last complete or partial transmission instance of the PUCCH transmission; and
      receive, from the UE, one or more additional repetitions of the PUCCH transmission based, at least in part, on the application time of the second repetition factor.

25. The apparatus of claim 24, wherein the application time starts from a transmission instance of the PUCCH transmission, after the last complete or partial transmission instance of the PUCCH transmission before a time of the dynamic indication.

26. The apparatus of claim 24, wherein the application time starts from a first instance of the PUCCH transmission that is only partially transmitted prior to the receipt of the dynamic indication.

27. The apparatus of claim 24, wherein the second repetition factor is indicated to the UE via a downlink control information (DCI).

28. The apparatus of claim 27, wherein a time of the dynamic indication corresponds to:
   a beginning time of the DCI indicating at least one of: the second repetition factor or a time offset for a processing time of the DCI; or
   an ending time of the DCI indicating at least one: the second repetition factor or the time offset for the processing time of the DCI.

29. The apparatus of claim 24, wherein the PUCCH transmission carries an acknowledgment (ACK) or a negative ACK (NACK) for a downlink data channel configured using semi-persistent scheduling (SPS).

30. The apparatus of claim 24, wherein the PUCCH transmission carries periodic channel state information (CSI).

\* \* \* \* \*